United States Patent Office 2,753,373
Patented July 3, 1956

2,753,373

METHODS OF PREPARING PHTHALIC ACID DERIVATIVES

Brian L. Hutchings and Robert W. Broschard, Pearl River, and Coy W. Waller, Nanuet, N. Y., assignors to American Cyanamid Company, New York, N. Y., a corporation of Maine No Drawing. Application May 3, 1952,
Serial No. 286,024

3 Claims. (Cl. 260—521)

This invention relates to certain new phthalic acid derivatives and methods of preparing the same. More particularly this invention relates to 3-halo-6-alkoxyphthalic acids, the 3-halo-6-hydroxyphthalic acids, and their patentable equivalents such as the cyclic anhydrides, simple esters and salts.

The new acid compounds of this invention can be represented by the following formula:

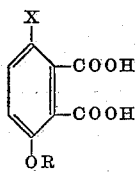

where X represents halogen and R represents hydrogen or a lower alkyl radical for instance methyl, ethyl, or propyl. The new dibasic acids, typical of aromatic ortho acids, form cyclic anhydrides which can be represented by the following formula:

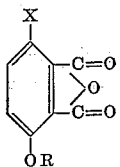

where X and R are as defined above. The new acids also form salts and esters in a manner typical of carboxylic acids and can, for instance, be prepared in the form of the disodium salt or the diethyl ester. It is intended that such simple derivatives also constitute a part of the present invention.

The new compounds of this invention are crystalline solids useful in many of the same applications where phthalic acid and phthalic anhydride are known to be of value. For instance, the new compounds, when in the form of the anhydrides, can be reacted with a polybasic alcohol, such as glycerol, to form polyester resins. In addition to the above, the new compounds have other utility. For instance, the new compounds have fungicidal activity and can be employed in compositions prepared for use as fungicides.

While it is not intended that this invention be limited to the above class of compounds when prepared by any one particular procedure, a new method of preparing this new class of compounds has been discovered and it is intended that this new method also constitute a part of the present invention. According to the new method of this invention, a bisulfite addition complex of a 3-halo-6-(lower alkoxy)phthalaldehydic acid is treated with a strong oxidizing agent in neutral or basic aqueous solution. While the exact structure of the bisulfite complex is not known with certainty, it is believed that this new reaction can be best illustrated by the following equation:

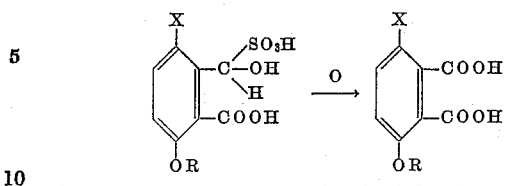

where X and R are as previously defined.

The bisulfite addition complex employed as a starting material in the new process of this invention is prepared by treating the corresponding 3-(lower alkoxy)-6-halophthalonic acid with a sulfite salt and then with a mineral acid. The phthalonic acid compound can, in turn, be prepared by one of several methods, for instance, by the oxidation of the corresponding 3-methyl-4-halo-7-(lower alkoxy)phthalide with potassium permanganate in basic solution. This series of reactions can be illustrated by the following equation:

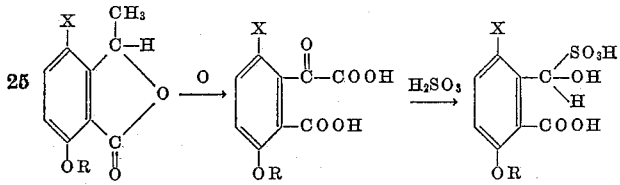

where R and X are as previously defined. Detailed procedures for accomplishing the above reactions are given in the specific examples to follow.

Once the new phthalic acid compounds of this invention have been prepared they can be transformed to the corresponding cyclic anhydrides by the same procedures employed to transform phthalic acid to phthalic anhydride. For instance, the new acids of this invention can be transformed to the anhydrides by simply heating; heating in an anhydrous solvent such as acetic anhydride; or heating in a solvent which forms an azeotropic mixture with water, for instance, ethyl acetate or benzene. In fact, as will be shown by the examples to follow, it is possible to obtain the cyclic anhydrides of this invention directly from the reaction mixture by employing an anhydrous purification procedure. Of course, the anhydrides can be transformed to the corresponding acids by simply heating with water or by treating the anhydride with an aqueous base followed by acidification.

The new reaction of this invention is preferably performed in basic aqueous solution. Of course by aqueous solution it is meant that some water is present in the reaction mixture and various amounts of other water miscible liquids, such as dioxane or acetone, can also be present. The aqueous solution can be at any pH of above about pH 7 up to the pH of concentrated sodium hydroxide, but the reaction mixture should preferably have a pH of a numerical value of at least about ten. Such hydrogen ion concentrations can be obtained by the addition to the aqueous solution of any of the usual bases, for instance sodium hydroxide or potassium hydroxide.

Strong oxidizing agents suitable for the new process of this invention may be illustrated by potassium permanganate and potassium dichromate. Potassium permanganate is preferred since it is more readily employed at the hydrogen ion concentrations suitable for the new process of this invention. The strong oxidizing agent is used in at least stoichiometrical amounts, and preferably in a large excess. With potassium permanganate, the presence of an excess is readily determined by the purple color of the solution, and this is an additional reason why potassium permanganate is the preferred oxidizing agent.

It is an advantage of the new process of this invention that it can be performed over a wide temperature range with temperatures from the freezing point of the reaction mixture up to the reflux temperature of the reaction mixture being satisfactory. The reaction proceeds quite readily at room temperature, although it is accelerated by heating and a somewhat faster reaction is obtained if temperatures in the range of 60° C. to 100° C. are employed. At room temperature, i. e., 20° C. to 30° C., the reaction is usually complete in about two to three hours and at 100° C. the reaction is usually complete in about forty-five minutes.

The invention will be more specifically illustrated by the following examples in which all parts are by weight unless otherwise indicated.

EXAMPLE I

Preparation of the free acids 550 mg. of 3-methyl-4-chloro-7-methoxyphthalide-3-carboxylic acid, prepared by the procedure disclosed in copending U. S. application S. N. 286,021 filed concurrently herewith, were heated in acetic anhydride and pyridine for two-three hours. The acetic anhydride was then removed by evaporation and the residue dissolved in ethyl acetate. The ethyl acetate solution was extracted with an equal volume of pH 7 phosphate buffer (1 M), and the organic phase concentrated to dryness. The resulting residue of crude 3-methyl-4-chloro-7-methoxyphthalide was dissolved in 30 ml. of 0.5 N NaOH by heating on the steambath. The resulting solution was cooled to room temperature, excess $KMnO_4$ was added and the oxidation carried out for twenty-four hours at room temperature. At the end of this time the excess permanganate was discharged by the addition of methanol. The solution was then filtered, acidified to pH 1-2, and extracted with 2 volumes of ethyl acetate. The ethyl acetate extracts were concentrated to dryness and the residue crystallized from water. The crystals were collected, dried and recrystallized from ethyl acetate-petroleum ether to yield about 334 mgs. of 3-methoxy-6-chlorophthalonic acid.

A sample of 250 mgs. of 3-methoxy-6-chlorophthalonic acid was dissolved in 10 ml. of 1 M $NaHSO_3$ and concentrated to dryness on the steambath. The residue was dissolved in 10 ml. of water, acidified and concentrated slightly to remove $SO_2$. This solution of the bisulfite complex was diluted to 50 ml., adjusted to 0.5 N with alkali and then excess potassium permanganate was added. The solution was heated for one and one-half hours at 80° C. and then allowed to stand at room temperature for three hours. The excess permanganate was discharged with $NaHSO_3$, the solution acidified to pH 1 and extracted with several volumes of ethyl acetate. The aqueous phase was concentrated to dryness. The resulting residue of 3-methoxy-6-chlorophthalic acid was purified by recrystallization from amyl acetate-petroleum ether.

Other 3-(lower alkoxy)-6-halophthalic acids are prepared by the same procedure as above except that the appropriate 3-methyl-4-halo-7-(lower alkoxy)phthalide-3-carboxylic acid is substituted for the 3-methyl-4-chloro-7-methoxyphthalide-3-carboxylic acid employed in the above example. For instance 3-methoxy-6-bromophthalic acid or 3-ethoxy-6-chlorophthalic acid can be prepared by substituting an equal molar quantity of 3-methyl-4-bromo-7-methoxyphthalide-3-carboxylic acid or 3-methyl-4-chloro-7-ethoxyphthalide-3-carboxylic acid respectively for the 3-methyl-4-chloro-7-methoxyphthalide-3-carboxylic acid employed in the above example.

EXAMPLE II

Preparation of the cyclic anhydrides

One hundred seventy mgs. of the 3-methoxy-6-chlorophthalonic acid, prepared by the method of Example I, were dissolved in 8 ml. of 1 M $NaHSO_3$ and evaporated to dryness on the steam bath. The residue was dissolved in water, acidified and concentrated slightly to remove $SO_2$. Concentrated NaOH was added to give a 0.5 N solution and to the resulting basic solution there was added an excess of $KMnO_4$. After twenty-four hours at room temperature, the excess $KMnO_4$ was discharged with $NaHSO_3$ and the product was extracted into ethyl acetate. The ethyl acetate extract was concentrated to dryness and the resulting residue was crystallized once from benzene and once from amyl acetate to yield about 80 mgs. of 3-methoxy-6-chlorophthalic anhydride.

EXAMPLE III

Preparation of the dimethyl ester 3-methoxy-6-chlorophthalic acid (130 mgs.) was dissolved in about 20 ml. of saturated $Na_2CO_3$ solution and heated for one hour. Then 7 ml. of methyl sulfate was added in 1 ml. aliquots to the hot solution. The mixture was maintained at an alkaline pH with $Na_2CO_3$. After the addition was completed, the mixture was left at room temperature for two to three hours, whereupon an oil formed. The mixture was again treated with methyl sulfate as described above, and then left overnight. The ester crystallized and was separated. Recrystallization from methanol-water yielded about 92 mg. of the purified dimethyl 3-methoxy-6-chlorophthalate.

EXAMPLE IV

Preparation of 3-chloro-6-hydroxyphthalic anhydride

One gram of 3-chloro-6-methoxyphthalic anhydride was refluxed with 50 ml. of 48% HBr for three hours, the resulting solution diluted with an equal volume of water and then extracted three times with equal volumes of ethyl acetate. The combined ethyl acetate extracts were evaporated to dryness and the resulting residue of 3-chloro-6-hydroxyphthalic anhydride was purified by recrystallization from ethyl acetate-benzene.

We claim:

1. A method of preparing compounds selected from the group consisting of the dicarboxylic acids represented by the formula:

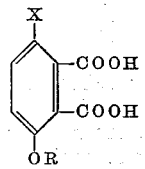

where X represents halogen and R represents a member selected from the group consisting of hydrogen and lower alkyl radicals; which comprises treating a bisulfite addition complex of a 3-halo-6-(low alkoxy)phthalaldehydic acid with a strong oxidizing agent in aqueous solution, and maintaining the hydrogen ion concentration of the reaction mixture at a pH of a numerical value of at least about seven.

2. The method of claim 1 where said strong oxidizing agent is potassium permanganate.

3. The method of claim 2 where the hydrogen ion concentration of the reaction mixture is maintained throughout substantially the entire oxidation at a pH of a numerical value of at least ten.

References Cited in the file of this patent

Pratt: "Chem. Abst." (1918), vol. 12, page 481.
Grewe: "Chem. Abst." (1938), vol. 32, pgs. 4574–4575.
King: "Chem. Abst." (1939), vol. 33, page 7773.
Faltis et al.: "Chem. Abst." (1941), vol. 35, pages 5121–5122.
Carter et al.: "Chem. Abst." (1942), vol. 36, pgs. 4108–4109.